(12) United States Patent
Miyaji

(10) Patent No.: US 6,557,527 B2
(45) Date of Patent: May 6, 2003

(54) KNOCK CONTROL APPARATUS FOR INTERNAL COMBUSTION ENGINE

(75) Inventor: Hidetoshi Miyaji, Tokyo (JP)

(73) Assignee: Mitsubishi Denki Kabushiki Kaisha, Tokyo (JP)

(*) Notice: Subject to any disclaimer, the term of this patent is extended or adjusted under 35 U.S.C. 154(b) by 0 days.

(21) Appl. No.: 09/996,578

(22) Filed: Nov. 30, 2001

(65) Prior Publication Data

US 2002/0179054 A1 Dec. 5, 2002

(30) Foreign Application Priority Data

May 30, 2001 (JP) ........................................ 2001-162397

(51) Int. Cl.$^7$ ................................................. F02P 5/00
(52) U.S. Cl. ............................................... 123/406.36
(58) Field of Search ....................... 123/406.36, 406.37

(56) References Cited

U.S. PATENT DOCUMENTS 5,134,980 A * 8/1992 Sakakibara et al. .... 123/406.38
5,205,280 A * 4/1993 Dennison et al. .......... 600/112
5,305,722 A * 4/1994 Fukui .................... 123/406.37
6,234,146 B1 * 5/2001 Tanaya et al. .......... 123/406.37
6,474,302 B2 * 11/2002 Takahashi et al. ...... 123/406.21

FOREIGN PATENT DOCUMENTS

JP 6-249047 9/1994

* cited by examiner

Primary Examiner—John Kwon
(74) Attorney, Agent, or Firm—Sughrue Mion, PLLC

(57) ABSTRACT

Even in the rapid change of a knock sensor output signal level (noise level) at a transition, a knock erroneous judgement due to noise is prevented in a state where knock controllability is secured. It is judged whether or not a transition state occurs, on the basis of a change of an operating state of an internal combustion engine and under a predetermined judgement condition, and in the case where the transition state occurs, at the time of the judgement of the transition state and during a predetermined time after the judgement, a correction value of a peak hold value of the knock sensor output signal is calculated.

4 Claims, 5 Drawing Sheets

KNOCK CONTROL APPARATUS FOR INTERNAL COMBUSTION ENGINE

BACKGROUND OF THE INVENTION

1. Field of the Invention

The present invention relates to a knock control apparatus for an internal combustion engine.

2. Description of the Related Art

FIG. 1 shows an example of a structure of a general internal combustion engine and peripheral equipment. In the drawing, reference numeral 18 designates an internal combustion engine (hereinafter referred to as an engine) mounted in a vehicle, and this engine 18 is connected to an intake pipe 15 and an exhaust pipe 16. A downstream portion of the intake pipe 15 is constructed so as to branch to introduce intake air into respective cylinders of the engine 18, and the exhaust pipe 16 is constructed by branch portions corresponding to the respective cylinders and a collecting portion where the branch portions are collected. A throttle valve operated by a driver is provided at an upstream side of the intake pipe 15, and a throttle sensor 2 for outputting a signal proportional to an opening degree of the throttle valve is provided at a rotating shaft of the throttle valve. An ISC valve 17 is provided in a bypass parallel to the throttle valve, and an air cleaner 4, an intake air temperature sensor 3 for outputting a signal proportional to an intake air temperature, and an air flow sensor 1 for outputting a signal proportional to an intake air amount are provided at an upstream side of the throttle valve. At an intermediate portion of the intake pipe 15, as shown in the drawing, an EGR valve 8 is provided, and a bypass extending to the exhaust pipe 16 from the vicinity of the EGR valve 8 is provided. In the vicinity of the connection portion of the exhaust pipe 16 with the bypass, an O2 sensor 6 for outputting a signal proportional to a residual oxygen concentration in exhaust gas is provided.

An injector 10 for fuel injection is provided at each of the branch portions of the downstream portion of the intake pipe 15, and a predetermined amount of fuel sent through a delivery pipe 19 is injected into the engine 18 from the injector 10. The engine 18 is provided with a water temperature sensor 14 for outputting a signal proportional to the temperature of cooling water for cooling the engine 18 and a knock sensor 13 for detecting knock. Further, the engine 18 is provided with an ignition coil 9 corresponding to each cylinder, and a crank angle sensor 5 for outputting a signal proportional to the revolution speed of the engine 18. The signals of the respective sensors are inputted to an ECU 12 constituted of a microcomputer, and the ECU 12 carries out an operation for controlling the injector 10, the igniter and the like on the basis of the input signals, and outputs control signals.

An operation thereof will be described. When a driver turns a key and switches on an ignition at the time of start of the engine, current starts flowing through the ECU 12 for controlling the engine, and various sensors and actuators fixed to the engine 18 as well. Thereafter, when the driver turns a start switch (SW) 7, a stator is connected to a battery 11, thereby cranking the engine 18. When the engine 18 is cranked, the ECU 12 starts the fuel injection into the respective cylinders, and controls the engine 18 so that the respective cylinders are ignited.

FIG. 4 is a block diagram showing a structure of a conventional knock control apparatus for an internal combustion engine. FIG. 5 is an explanatory view showing a variation of each value in the conventional apparatus of FIG. 4. In FIG. 4, reference numerals 12 and 13 designate the ECU and the knock sensor shown in FIG. 1, respectively. The structure in the ECU 12 will be described. Reference numeral 20 designates a knock I/F circuit including a band pass filter 21 and a peak hold 22, in which an output signal from the knock sensor 13 is inputted, only a knock intrinsic frequency component is extracted from the output signal of the knock sensor by the band pass filter 21, and the output signal of the band pass filter in a predetermined period (B6° to A104°) of each cylinder is peak-held by the peak hold portion 22. Reference numeral 24 designates an A/D conversion portion for A/D converting the peak hold signal outputted from the knock I/F circuit 20. Reference numeral 25 designates a BGL including an averaging portion 26 and a threshold (BGL) calculation portion 27, in which the A/D converted peak hold signal is averaged and amplified to obtain a threshold level (BGL) for a knock judgement. Reference numeral 28 designates a compare subtraction portion, which compares the peak hold signal with the BGL, judges the presence of occurrence of knock, and outputs a signal proportional to the intensity of knock. Reference numeral 29 designates an every one ignition delay angle amount calculation portion, which calculates a delay angle amount proportional to the intensity of knock for every one ignition from the knock judgement result of the compare subtraction portion 28. Reference numeral 30 designates a knock delay angle amount calculation portion, which integrates the delay angle amount for every one ignition and calculates a knock correction amount of ignition timing, however, in the case where knock does not occur, an advance angle return is made. Reference numeral 31 designates an A/D conversion portion for A/D converting a knock sensor output signal outputted from the knock sensor 13. Reference numeral 32 designates a knock sensor fail detection portion, which detects failure (disconnection, short circuit, etc.) of the knock sensor 13 on the basis of the A/D converted knock sensor output signal, and makes a predetermined amount delay angle correction.

An operation thereof will be described. A knock intrinsic frequency component is extracted from the output signal of the knock sensor 13 by the band pass filter 21 and is amplified. The signal after the processing is, as shown in FIG. 5, peak-held during a predetermined period (B6° (BTDC6° CA) to A104° (ATDC104° CA)) after ignition of each cylinder. The peak hold value is compared with a knock judgement level at that time, and a knock judgement is made. This knock judgement level is determined in such a manner that a prescribed averaging processing from the peak hold value is carried out, and the calculation from the averaged value (multiplying it by a coefficient and adding an offset thereof) is carried out. In this averaging processing, in view of the compatibility between stabilization of the knock judgement level (suppression of fluctuation due to the variation of knock sensor signal level for each cycle) and followingness to the change of an average signal level due to the change of an operating state, two-stage filter processing and a suitable filter averaging coefficient are set.

The conventional knock control apparatus is constructed as described above, and in general, in accordance with the change of the peak hold value (noise level), and the knock judgement level is also sequentially calculated to be updated to a level suitable for the operating state of the engine at that time (suitable for the knock judgement and causing no erroneous judgement). However, in the case where the noise level is rapidly changed (increased), there occurs a state where the calculation of the knock judgement level can not follow, there temporarily occurs a state where the knock judgement level is low with respect to the noise level, and there has been a problem in that a knock erroneous judgement due to noise can occur.

As examples of the knock erroneous judgement, for example, the following two examples can be enumerated.

(1) At the time of rapid change (increase) in a noise level by the rapid increase of engine revolution.

(2) In a GDI engine, at the time when the generation timing of mechanical noise at the time of injector operation is changed from a state where it is outside a knock control detection period of a knock sensor output signal to a state where it is within the detection period thereof by the switching of an operating mode (fuel injection timing).

SUMMARY OF THE INVENTION

The present invention has been made to solve such problems, and has an object to obtain a knock control apparatus for an internal combustion engine, which can prevent the occurrence of a knock erroneous judgement due to noise in a rapid change of a knock sensor output signal level (noise level) at a transition, while knock controllability is secured.

In view of the above object, a knock control apparatus for an internal combustion engine of the present invention, which makes a knock judgement by comparing a peak hold value of a knock sensor output signal with a knock judgement level calculated from the peak hold value, comprising: transition state judgement means for judging whether a transition state occurs, on the basis of a change of an operating state of an internal combustion engine and under a predetermined judgement condition; and correction value calculation means for calculating, in a case wherein it is judged that the transition state occurs, a correction value of the peak hold value of the knock sensor output signal at a time of judgement of the transition state and during a predetermined time after the judgement.

The transition state may be in an acceleration mode, and the transition state judgement means may judge whether the acceleration mode occurs, on the basis of a revolution variation of the internal combustion engine.

Alternatively, the transition state may be in an acceleration mode, and the transition state judgement means judges whether the acceleration mode occur, on the basis of a throttle variation.

Further, the transition state may be at an operating mode switching time.

DETAILED DESCRIPTION OF THE PREFERRED EMBODIMENTS

Embodiment 1

Figure 1:
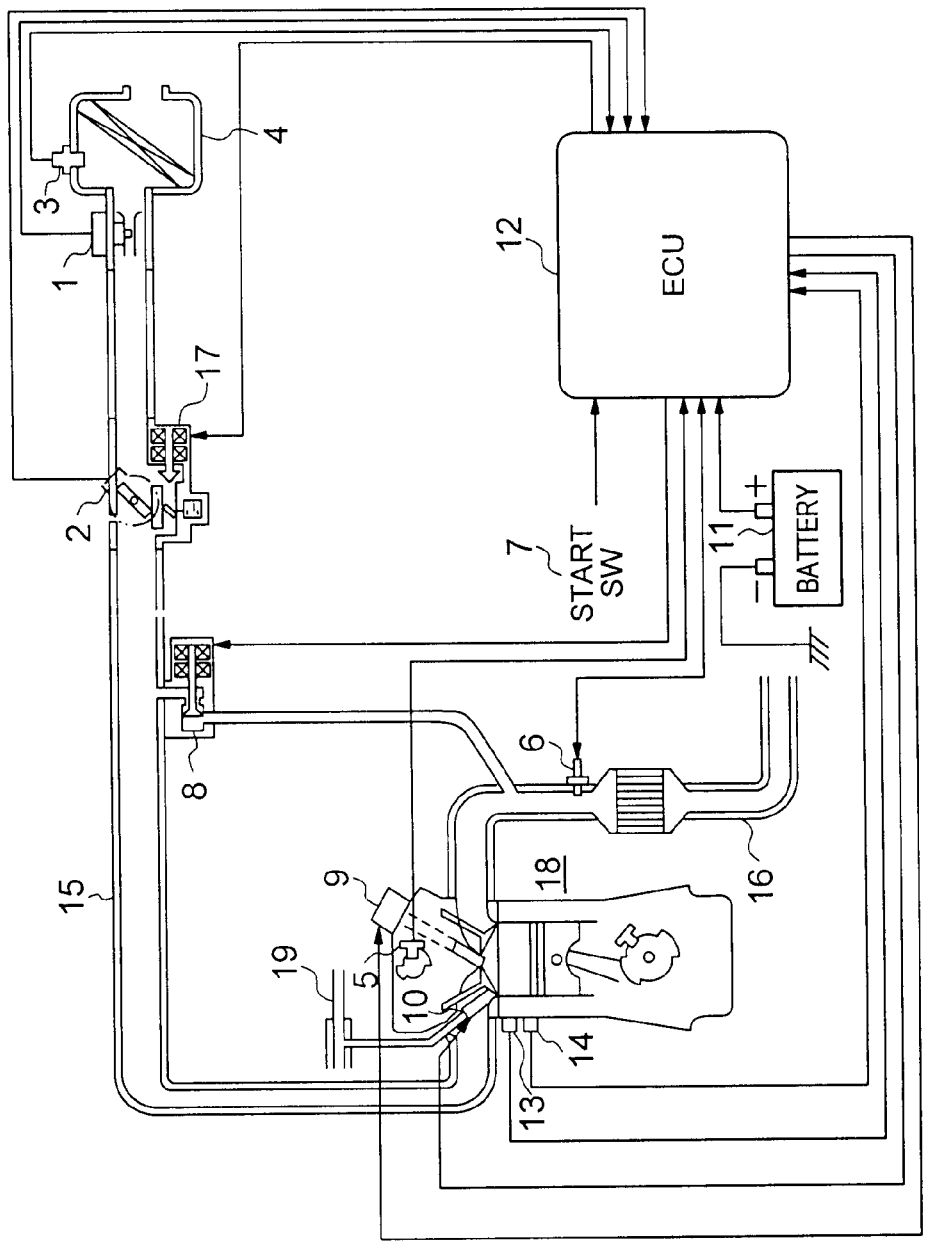
FIG. 1 is an overall view showing a structure of a general internal combustion engine and peripheral equipment.
Figure 2:
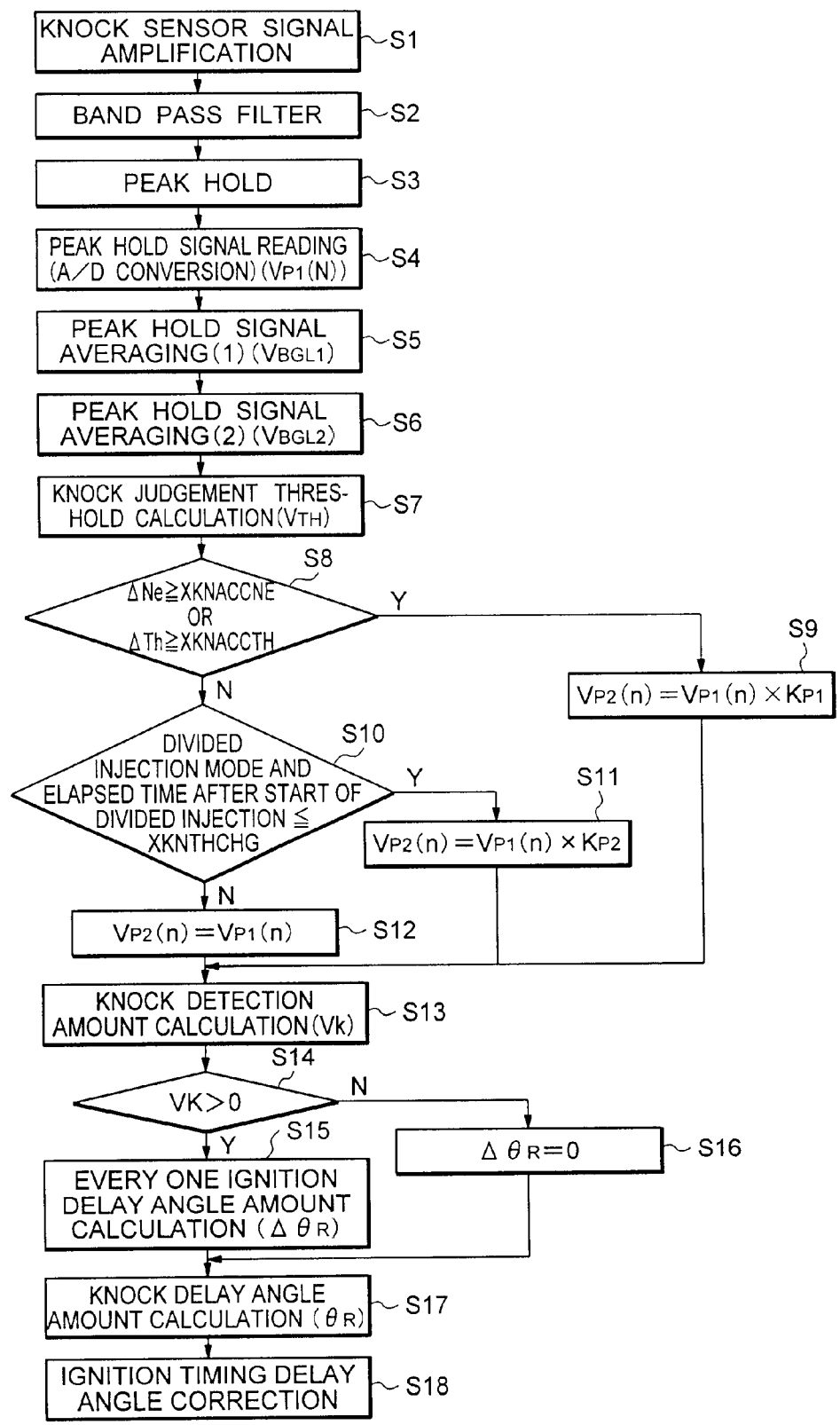
FIG. 2 is a flowchart showing an operation of knock control of a knock control apparatus for an internal combustion engine according to the present invention.
Figure 3:
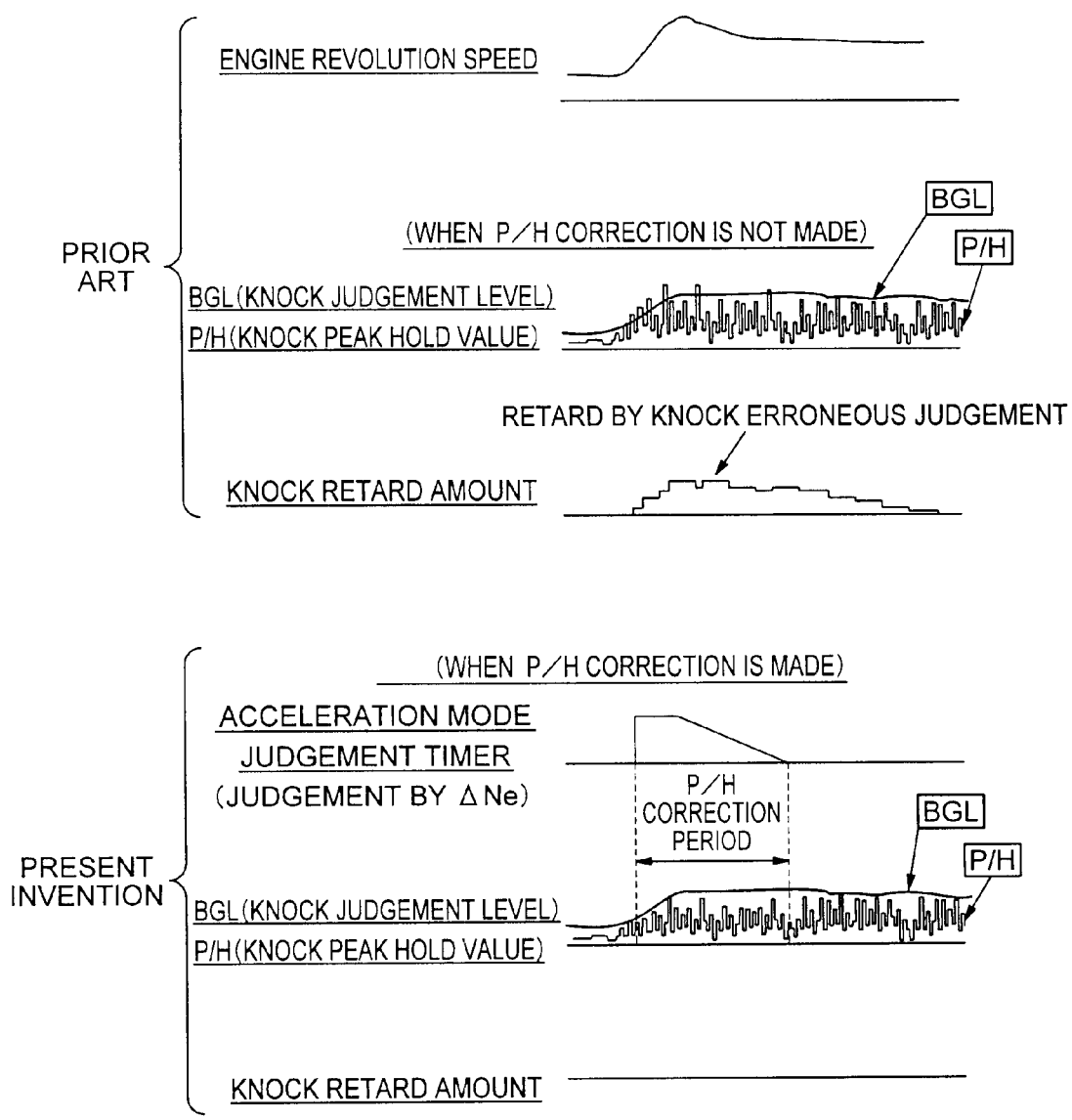
FIG. 3 is an explanatory view showing a change of each value in knock control of a knock control apparatus for an internal combustion engine according to the present invention and a conventional knock control apparatus for an internal combustion engine.
Figure 4:
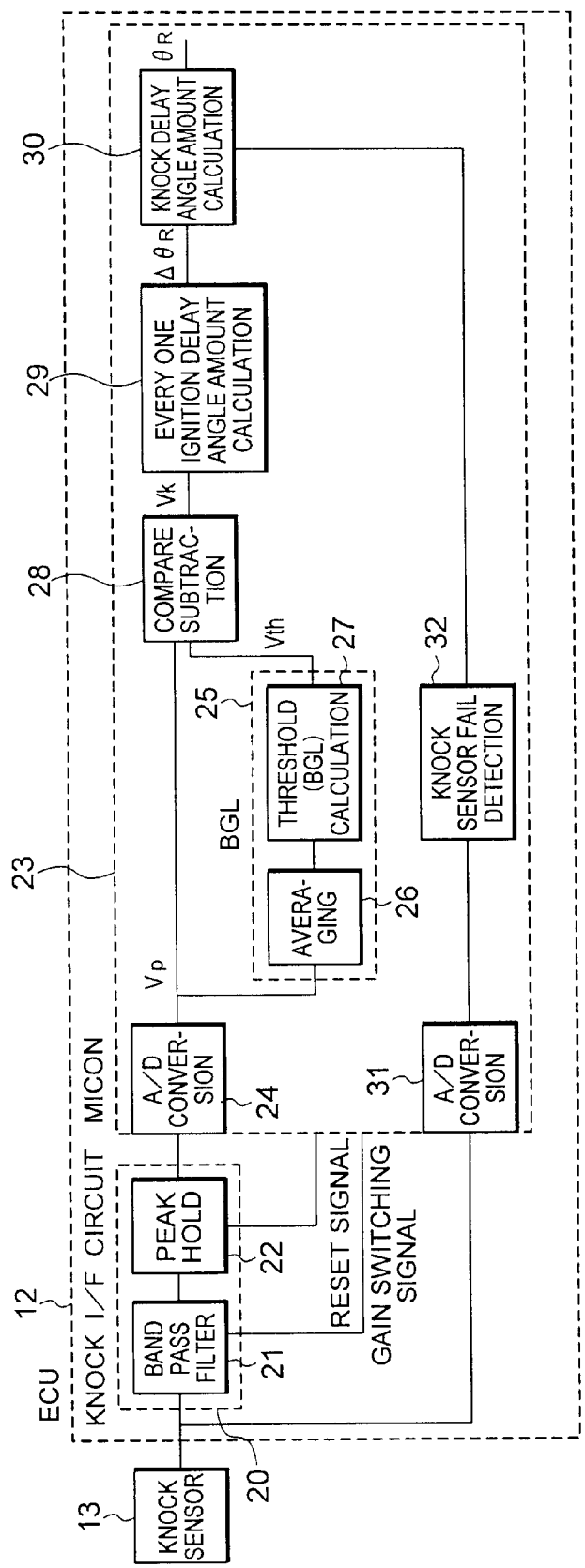
FIG. 4 is a block diagram showing a structure of a conventional knock control apparatus for an internal combustion engine.
Figure 5:
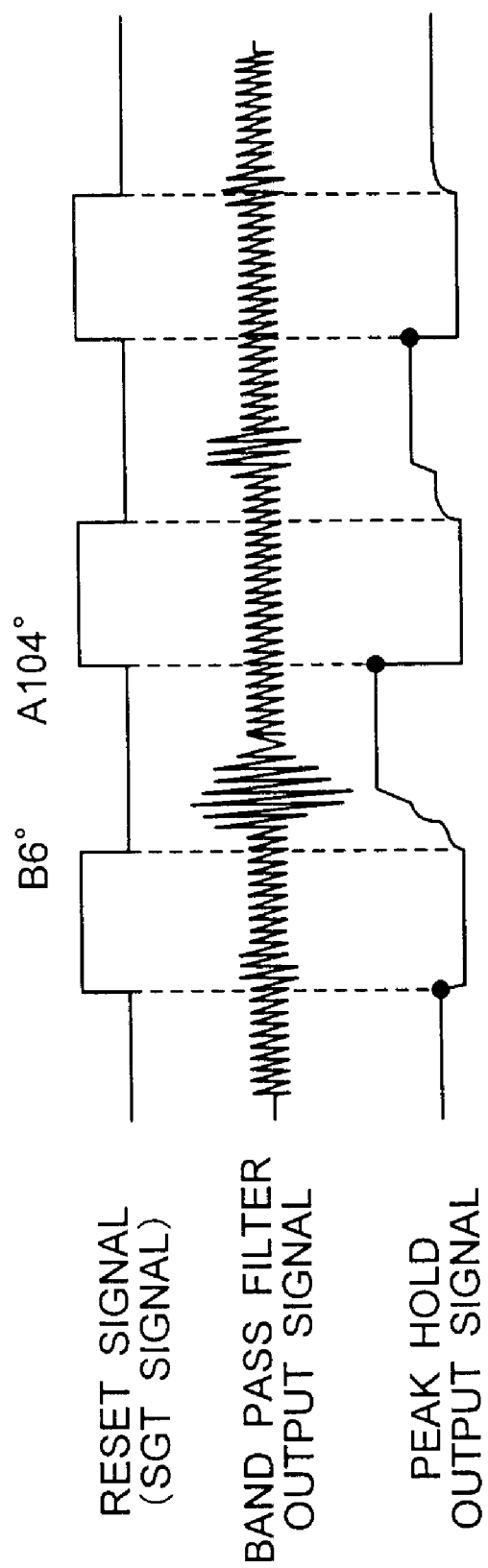
FIG. 5 is an explanatory view showing a change of each value of the conventional knock control apparatus for the internal combustion engine.

FIG. 1 is an overall view showing an example of a structure of an internal combustion engine and peripheral equipment to which a knock control apparatus for an internal combustion engine according to the present invention is applied. Since respective components in FIG. 1 are substantially the same as the foregoing, the description thereof is omitted here. Further, in the following description of this embodiment, although the description is given while the overall view of FIG. 1 is made an example, the knock control apparatus of the present invention is not limited to this case, but is applied to various internal combustion engines having other structures. FIG. 2 is a flowchart showing the operation of knock control in the knock control apparatus for the internal combustion engine according to the present invention, and FIG. 3 is an explanatory view showing the change of each value. Further, the structure of the knock control apparatus for the internal combustion engine according to the present invention is substantially the same as that of FIG. 4 except that a correction portion (not shown) for correcting a value of an A/D converted peak hold signal is provided between the A/D conversion portion 24 and the compare subtraction portion 28 of the structure of the conventional apparatus of FIG. 4, whereby its illustration is omitted here.

The operation of the knock control apparatus for the internal combustion engine according to the present invention will be described on the basis of FIG. 2. An output signal from the knock sensor 13 is amplified (step S1), and a knock intrinsic frequency component is extracted from the signal by the band pass filter 21 and is amplified (step S2). The signal is peak-held during a predetermined period (B6° (BTDC6° CA) to A104° (ATDC104° CA)) after ignition of each cylinder (step S3). Next, the peak hold signal is read by the A/D conversion portion 24 and is A/D converted (step S4).

Next, the peak hold value is averaged by the averaging portion 26. In this embodiment, averaging is first carried out by a first filter (not shown) in accordance with the following expression (1) (step S5).

$$V_{BGL1(n)} = K_1 \times V_{p1(n)} + (1-K_1) \times V_{BGL1(n-1)} \quad (1)$$

(where, $V_{P1(n)}$: peak hold value, $K_1$: first averaging coefficient).

By using a value obtained according to the above expression (1), averaging is next carried out by a second filter (not shown) in accordance with the following expression (2) (step S6).

$$V_{BGL2(n)} = K_2 \times V_{BGL1(N)} + (1-K_2) \times V_{BGL2(n-1)} \quad (2)$$

(where, $k_2$: second averaging coefficient).

By using a value obtained according to the above expression (2), a threshold level is next calculated by a threshold calculation portion 27 in accordance with the following expression (3) (step S7).

$$V_{TH} = V_{BGL2(n)} \times K_{th} + V_{ofs} \quad (3)$$

(where, $K_{th}$: threshold coefficient, $V_{ofs}$: threshold offset).

Next, by a not-shown correction portion, on the basis of an engine revolution variation $\Delta Ne$ or a throttle variation $\Delta Th$, a state at the time when the following expressions (4) and (5) are established and during a predetermined time after the establishment is defined as an acceleration mode, and it is judged whether or not the acceleration mode occurs (step S8).

$$\Delta Ne/100 msec \geq XKNACCNE \quad (4)$$

$$\Delta Th/100 msec \geq XKNACCTH \quad (5)$$

(where, XKNACCNE: threshold of engine revolution variation, XKNACCTH: threshold of throttle variation).

As a result, in the case where it is judged that the acceleration mode occurs, the peak hold value is corrected according to the following expression (6), and the final peak hold $V_{p2(n)}$ is obtained (step S9).

$$V_{p2(n)} = V_{P1(n)} \times K_{p1} \quad (6)$$

(where, $K_{p1}$: correction coefficient 1).

On the other hand, in the case where it is judged that the acceleration mode does not occur, next, a state at the time of a divided injection mode and in an elapsed time, which is equal to XKNTHCHG (threshold of elapsed time) or less, after the start of divided injection, is defined as an operating mode switching time, and it is judged whether or not the operating mode switching time occurs (step S10).

As a result, in the case where it is judged that the operating mode switching time occurs, the peak hold value is corrected according to the following expression (7) (step S11)

$$V_{p2(n)} = V_{P1(n)} \times K_{P2} \quad (7)$$

(where, $K_{p2}$: correction coefficient 2).

On the other hand, in the case where it is judged that the operating mode switching time does not occur (that is, in the normal state), the correction of the peak hold value is not carried out, and the peak hold value is used as it is as in the following expression (8) (step S12).

$$V_{P2(n)} = V_{P1(N)} \quad (8)$$

Next, by the compare subtraction portion 28, the final peak hold $V_{p2(n)}$ obtained in the manner as described above is compared with the threshold level $V_{TH}$ obtained by the threshold calculation portion 27, and a knock judgement is carried out (steps 13 and 14).

$$V_{K(n)} = V_{p2(n)} - V_{TH} \quad (9)$$

Next, in the case where the result of the expression (9) is larger than 0, according to the expression (10), a delay angle control amount for every one ignition is calculated in accordance with the knock level by the every one ignition delay angle amount calculation portion 29 (step S15).

$$\Delta \theta_{R(n)} = V_{K(n)} / V_{TH} \times K_g + 0.35 °CA \quad (10)$$

(where, $K_g$: delay angle amount mirrored coefficient).

On the other hand, in the case where the result of the expression (9) is not larger than 0, the delay angle control amount $\Delta \theta_{R(n)}$ for every one ignition is made 0 (step S16).

Next, the delay angle amount for every one ignition is integrated by the knock delay angle amount calculation portion 30 in accordance with the following expression (11), and the knock correction amount of ignition timing is calculated (step S17). However, in the case where there is no occurrence (judgement) of knock, the knock correction amount is decreased at a predetermined speed.

$$\theta_{R(n)} = \theta_{R(n-1)} + \Delta \theta_{R(n)} - K_{a(t)} \quad (11)$$

(where, $K_{a(t)}$: advance angle return constant)

The knock correction amount $\theta_{R(n)}$ obtained in the manner as described above is made to be reflected on the ignition timing by the following expression (12) (step S18).

$$\theta_{ig} = \theta_B - \theta_R \quad (12)$$

(where, $\theta_B$: base ignition timing).

Further, the knock sensor output signal peak value before the correction is used for the calculation of the knock judgement level during the period when this correction is carried out.

As described above, in the knock control apparatus for the internal combustion engine according to the present invention, when the knock sensor output signal level (noise level) is rapidly changed (increased) at the time of rapid change of engine revolution or its load and at the transition such as the switching time of the operating mode (fuel injection timing) of a DI (cylinder injection of fuel) engine, the transition state is judged under the predetermined judgement condition from the change (revolution, the change amount of a throttle, the operating mode switching of the DI engine, etc.) of the operating state of the engine, and the peak value of the knock sensor output signal is corrected at the time of judgement of the transition state and during a predetermined time after the judgement. Thus, even in the rapid change of the transition knock sensor output signal level (noise level) at the transition, the knock erroneous judgement due to noise can be prevented in the state where knock controllability is secured.

What is claimed is:

1. A knock control apparatus for an internal combustion engine, which makes a knock judgement by comparing a peak hold value of a knock sensor output signal with a knock judgement level calculated from the peak hold value, comprising:

transition state judgement means for judging whether a transition state occurs, on the basis of a change of an operating state of an internal combustion engine and under a predetermined judgement condition; and correction value calculation means for calculating, in a case wherein it is judged that the transition state occurs, a correction value of the peak hold value of the knock sensor output signal at a time of judgement, of the transition state and during a predetermined time after the judgement.

2. A knock control apparatus for an internal combustion engine according to claim 1, wherein the transition state is in an acceleration mode, and the transition state judgement means judges whether the acceleration mode occurs, on the basis of a revolution variation of the internal combustion engine.

3. A knock control apparatus for an internal combustion engine according to claim 1, wherein the transition state is in an acceleration mode, and the transition state judgement means judges whether the acceleration mode occur, on the basis of a throttle variation.

4. A knock control apparatus for an internal combustion engine according to claim 1, wherein the transition state is at an operating mode switching time.

* * * * *